Figure 1:
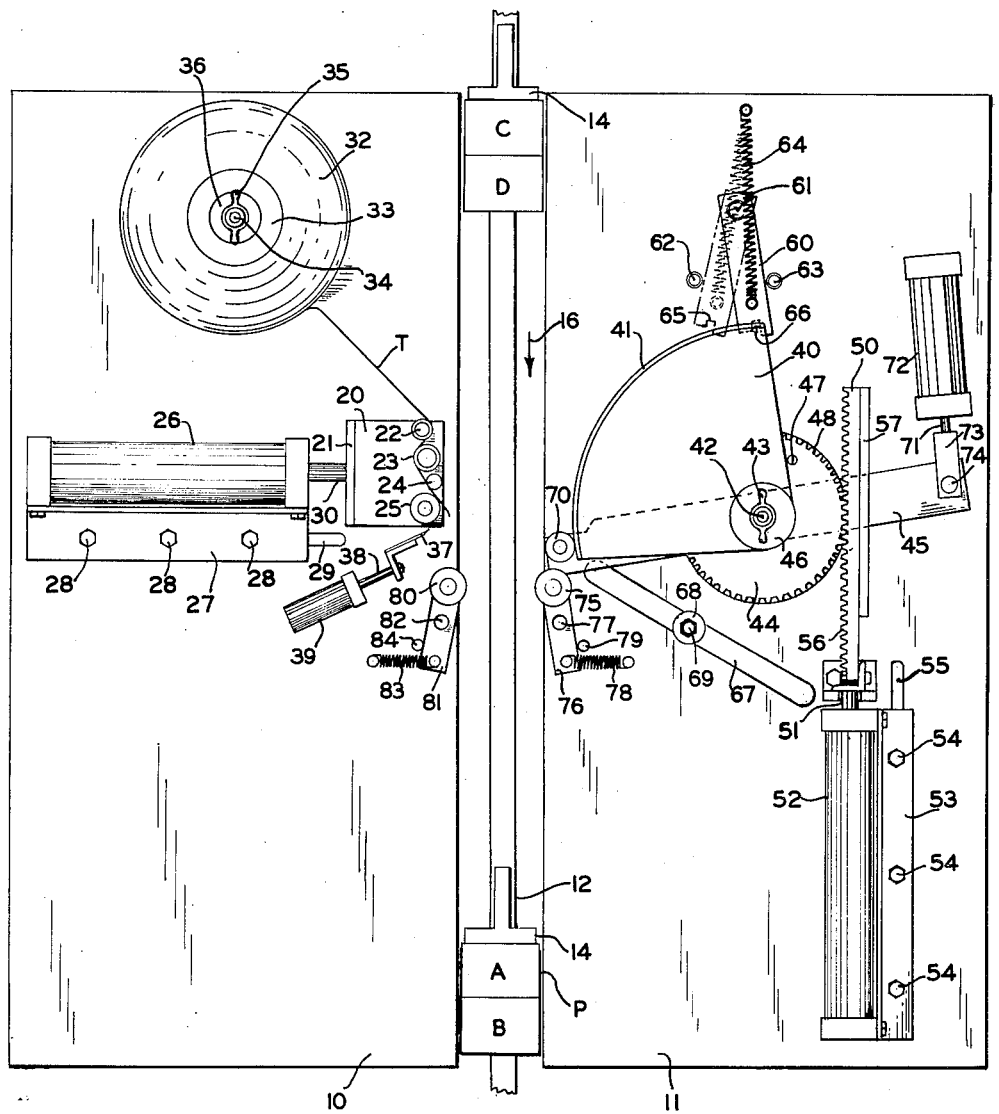

June 5, 1962  R. J. SMITH  3,037,335
TAPE ATTACHING MACHINE
Filed June 7, 1960  2 Sheets-Sheet 1

INVENTOR.
RAYMOND J. SMITH
BY
Carpenter, Abbott, Coulter & Kinney
ATTORNEYS

June 5, 1962 R. J. SMITH 3,037,335
TAPE ATTACHING MACHINE
Filed June 7, 1960 2 Sheets-Sheet 2

INVENTOR.
RAYMOND J. SMITH
BY
Carpenter, Abbott, Coulter & Kinney
ATTORNEYS

United States Patent Office 3,037,335
Patented June 5, 1962

3,037,335
TAPE ATTACHING MACHINE
Raymond J. Smith, St. Paul, Minn., assignor to Minnesota Mining and Manufacturing Company, St. Paul, Minn., a corporation of Delaware
Filed June 7, 1960, Ser. No. 34,434
7 Claims. (Cl. 53—198)

This invention relates to a machine for attaching normally tacky pressure-sensitive adhesive tape to articles, such as cartons or boxes, to strengthen or seal them, or to wrap a number of separate articles to form them into a bundle. More particularly, the present invention relates to apparatus for attaching adhesive tape to articles which are being moved along a pre-determined path, such as articles being moved by a conveyor.

The invention provides means for holding one end from a quantity of tape on one side of a conveyor, means for storing said end and a portion of tape adjoining said end on the other side of the conveyor, means for transporting said end and tape adjoining said end across the conveyor, from the holding means side to the storage means side of the conveyor, and means for adhering said end and a portion of said adjoining tape to said storage means, with the tape extended across the conveyor so that the adhesive side thereof will be contacted by and become adhesively attached to the articles as the articles are moved by the conveyor. The extended tape adheres to the leading surface of the article or articles, and the movement of the articles acts to pull the adhered tape from the storage means and simultaneously to pull tape from the holding means, and the tape pulled from the storage means and from the holding means is attached to the sides (or to the sides and trailing surface) of the articles by buffing means.

The storage means of the machine shown and described herein preferably includes a movable member having an arcuately-shaped surface, such as a wheel, or a section of a wheel, which is rotatably attached to the machine, and the adhering means includes means for moving said member. The adhesive side of one end from the quantity of tape is pressed against the surface of the movable member, and the movement of said member by the adhering means causes said end and a portion of tape adjoining said end to become adhered to said surface, for storage.

In the use of the machine herein described, tape from a supply roll is brought (with its adhesive surface facing the articles to which tape is to be applied) beyond a roller (called an applying roller) on the holding means. The tape is brought sufficiently beyond that roller so that the periphery of the roller will press the adhesive surface of the free end of the tape against the arcuately-shaped surface of a quadrant when the holding means is moved across the conveyor by a transporting mens, to press the free end of the tape against said surface of the quadrant. The quadrant is then rotated while the applying roller presses the tape against the quadrant, so that tape adjoining the free end is adhered to the arcuately-shaped surface of the quadrant, for storage. The holding means is then retracted back across the conveyor to extend a portion of the tape across the conveyor with the adhesive side of the extended portion of tape in position to be contacted by the articles being moved by the conveyor. Means is provided for retaining the stored tape in adhesive contact with the quadrant until the extended portion of tape is contacted by the moving articles and the movement of the articles acts to pull the stored tape from the quadrant and simultaneously pulls tape through the holding means, causing the quadrant to be counter-rotated.

Before the moving articles contact the extended portion of tape, the means for rotating the quadrant is retracted to permit the quadrant to be counter-rotated by the force exerted against the extended portion of tape by the moving article. Since the force exerted by the moving articles pulls the adhered tape from the surface of the quadrant, causing the quadrant to be counter-rotated, and simultaneously pulls tape from the holding means, and the resistance to the pull from these two sources of tape should be relatively equal, means are provided for adjusting the force required to pull tape from the holding means and means are provided for adjusting the force required to counter-rotate the quadrant, and these adjustable means can be set independently of each other to accomplish the desired result.

A machine which provides for the storage of tape on the opposite side of a conveyor from a supply of said tape has many advantages. For example, such a machine is capable of attaching tape to successive articles of various shape, and can also be used to attach tape simultaneously to a number of separate articles of different sizes, to form them into a bundle. The use of a rotatable wheel, or a section of a wheel, such as a quadrant, on which to store tape on the opposite side of a conveyor from a supply of said tape, has the advantage in that a minimum amount of space is required for storing a maximum amount of tape. A wheel, or a section of a wheel, is also easily regulated in order to store the particular amount of tape required, and can easily be evenly retarded in order to provide a relatively constant resistance to the pull on the tape being removed from storage.

The present invention, and other various objectives and advantages obtained thereby, will be apparent from the following description of the illustrative embodiment shown in the accompanying drawings, wherein like reference characters refer to similar parts in the corresponding views, and in which drawings:

FIGURE 1 is a plan view of a machine of the present invention, with a roll of pressure-sensitive adhesive tape threaded therein, showing the machine in rest position; and FIGURES 2–5 are schematic plan views of the machine shown in FIGURE 1, showing the machine in successive operating positions as tape is attached to two articles carried together on a conveyor, to form the two articles into a wrapped bundle.

Referring now to FIGURE 1, frame platforms 10 and 11 are attached to opposite sides of conveyor 12, so that said platforms oppose each other along the same area of said conveyor. Conveyor 12 is provided with cleats 14, which cleats engage the rear surface of the articles being carried on said conveyor, to push the articles at the speed of said conveyor. Articles A and B have been carried on conveyor 12 past the tape attaching apparatus, and have been formed into a bundle by the attached piece of tape P. Articles C and D are being carried on conveyor 12 in the direction indicated by arrow 16, to be wrapped together by the operation of the tape attaching apparatus and the movement of said articles by conveyor 12.

Tape deck 20 is a plate having a flanged edge 21. Rollers 22, 23, 24 and 25 are rotatably attached to tape deck 20. Air cylinder 26 is affixed to plate 27, and plate 27 is attached to platform 10 by bolts 28. Bolts 28 extend through slot 29 in platform 10, so that the position of air cylinder 26 on platform 10 can be adjusted. Piston rod 30 of air cylinder 26 is affixed at its end to flanged edge 21 of tape deck 20, so that the operation of air cylinder 26 will serve to transport tape deck 20 across conveyor 12 and back again to the position shown in FIGURE 1. Piston rod 30 is prevented from rotational movement within air cylinder 26, so that tape deck 20 is not permitted to rotate.

Tape supply roll 32 is mounted on hub 33, and hub 33 is rotatably attached on shaft 34. One end of shaft 34 is affixed to platform 10, and the other end of said shaft is threaded to receive wing nut 35. Friction washer 36 is journaled on shaft 34, and said washer is positioned between hub 33 and wing nut 35, so that by turning wing nut 35 the pressure between hub 33 and platform 10 can be adjusted, to retard the rotational movement of tape supply roll 32. A helical spring can be positioned on shaft 34, between wing nut 35 and washer 36, to provide greater variations in the pressure exerted on washer 36 by turning wing nut 35.

Tape T is unwound from tape supply roll 32 and threaded around roller 22, with the non-adhesive back side of the tape in contact with said roller. Tape T is then threaded around roller 23. The surface of roller 23 is preferably knurled or covered with an adhesive resistant material, since the adhesive side of said tape contacts said roller. Also, roller 23 contains a ratchet mechanism which prevents said roller from rotational movement in the clockwise direction, when viewed as shown in FIGURE 1, while allowing said roller to rotate in the opposite direction. The adhesive surface of tape T adheres lightly to the surface of roller 23, but roller 22 is positioned so that a substantial amount of the surface of roller 23 is in contact with the adhesive side of said tape, and the ratchet mechanism in roller 23 prevents the movement of tape T toward supply roll 32.

From roller 23, tape T is threaded so that the adhesive side of said tape contacts roller 24 and the nonadhesive side of said tape contacts applying roller 25. The surface of roller 24 is preferably knurled or covered with an adhesive resistant covering, since the surface of said roller is in contact with the adhesive surface of said tape, and roller 24 is positioned so that the free end of said tape will be positioned adjacent to the surface of applying roller 25, as shown in FIGURE 1. Knife 37 is attached to the end of piston rod 38 of air cylinder 39, and said air cylinder is attached to platform 10 so that the operation of said air cylinder will cause knife 37 to contact tape T which is adjacent to applying roller 25. Piston rod 38 is prevented from rotational movement within cylinder 39, so that knife 37 is not permitted to rotate.

Quadrant 40 is provided with flange edge 41 along the arcuately-shaped surface of said quadrant, and said quadrant is rotatably journaled on shaft 42. One end of shaft 42 is affixed to platform 11, and the other end of said shaft is threaded to receive wing nut 43. Pinion 44 is also journaled on shaft 42, beneath quadrant 40, and roller lever 45 is journaled on shaft 42, beneath pinion 44. Friction washer 46 is journaled on shaft 42, between wing nut 43 and quadrant 40, and a nut is threaded onto shaft 42, between said quadrant and pinion 44, so that the rotational movement of quadrant 40 around shaft 42 can be retarded by turning wing nut 43 to move said wing nut toward said quadrant. Also, washers are journaled on shaft 42 between pinion 44 and roller lever 45, and between roller lever 45 and platform 11, so that quadrant 40, said pinion and said lever can all be rotated independently of each other on shaft 42. A helical spring can be positioned on shaft 42, between wing nut 43 and washer 46, to provide greater variations in the pressure exerted on washer 46 by turning wing nut 43.

One end of stub shaft 47 is affixed to the upper surface of pinion 44, and the other end of said shaft extends upward far enough to bear against one of the straight edges of quadrant 40. Teeth 48 are formed along the peripheral surface of pinion 44. One end of rack 50 is attached to piston rod 51 of air cylinder 52. Air cylinder 52 is attached to cylinder plate 53 and cylinder plate 53 is attached to platform 11 by bolts 54. Bolts 54 are attached through slot 55 in platform 11, so that the position of said cylinder on platform 11 can be adjusted. Rack 50 contains teeth 56, which teeth engage teeth 48 in pinion 44, so that the operation of air cylinder 52 will cause pinion 44 to be rotated on shaft 42. Retaining bracket 57 is affixed to platform 11, to hold teeth 56 on rack 50 into engagement with teeth 48 on pinion 44.

Latch 60 is pivotably attached to platform 11 by pin 61. Stops 62 and 63 are affixed to platform 11, and said stops bear against the sides of latch 60, to limit the pivotal movement of said latch on pin 61. One end of spring 64 is attached to latch 60, and the other end of said spring is attached to platform 11. Slot 65 is formed in the free end of latch 60, and latch pin 66 protrudes downwardly from flanged edge 41 of quadrant 40, for engagement in said slot. When quadrant 40 is in the position shown in FIGURE 1, latch 60 and spring 64 are in the positions shown in solid lines in FIGURE 1, and when said latch and spring are in this position, spring 64 serves to hold quadrant 40 against stub shaft 47 on pinion 44. Thus, on the drive stroke of piston rod 51, when pinion 44 will be rotated in the counter-clockwise direction when viewed as shown in FIGURE 1, stub shaft 47 will immediately bear against the edge of quadrant 40, to rotate said quadrant with the movement of said pinion, and latch 60 and spring 64 will be moved to the position shown in broken lines in FIGURE 1. When quadrant 40 is later counter-rotataed (i.e. moved in the clockwise direction when viewed as shown in FIGURE 1), latch pin 66 is again engaged into slot 65, and latch 60 and spring 64 serve to re-position quadrant 40 by being moved to the position shown in solid lines in FIGURE 1.

Slot 67 is formed through platform 11, and stop 68 is held in place in slot 67 by bolt 69, which bolt extends through said slot, and said stop projects upwardly from platform 11 to the level occupied by quadrant 40. Stop 68 is adjustable in its position along slot 67, and said stop is set prior to the operation of the machine so that the edge of quadrant 40 will bear against said stop to prevent said quadrant from "coasting," and thereby overrunning the desired extent of rotational movement.

Quadrant roller 70 is rotatably attached to one end of roller lever 45, and said roller is positioned so that the peripheral surface of said roller contacts the convex surface of flanged edge 41 of quadrant 40. Piston rod 71 of air cylinder 72 is affixed to clevis 73, and said clevis is pivotably attached by pin 74 to the other end of roller lever 45, so that the operation of said cylinder will cause said lever to pivot on shaft 42, and move quadrant roller 70 along the arcuately-shaped surface of flanged edge 41.

Buffing roller 75 is rotatably attached to one end of buffing roller plate 76, and said plate is pivotably attached by pin 77 to platform 11. One end of spring 78 is attached to the other end of buffing roller plate 76, and the other end of said spring is attached to platform 11. Spring 78 serves to urge buffing roller 75 in the counter-clockwise direction, when viewed as is shown in FIGURE 1, toward conveyor 12. Stop 79 is affixed to platform 11, and said stop is positioned so that it will bear against the edge of buffing roller plate 76, to limit the movement of said buffing roller plate toward spring 78.

Buffing roller 80 is rotatably attached to one end of buffing roller plate 81, and said plate is pivotably attached by pin 82 to platform 10. One end of spring 83 is attached to the other end of buffing roller plate 81, and the other end of said spring is attached to platform 10. Spring 83 serves to urge buffing roller 80 in the clockwise direction, when viewed as is shown in FIGURE 1, toward conveyor 12. Stop 84 is affixed to platform 10, and said stop is positioned so that it will bear against the edge of buffing roller plate 81, to limit the movement of said buffing roller plate toward spring 83.

Compressed air, at a pressure of approximately 80 pounds per square inch, is supplied through solenoid operated air valves, to the air cylinders shown in the drawings and described above. The source of compressed air and the valves which control the flow of the air are not shown in the drawings, nor are the switches, since said switches can be attached directly to the parts of the machine or controlled by a four cam repeat cycle timer attached to the drive shaft of the conveyor.

Figure 2:
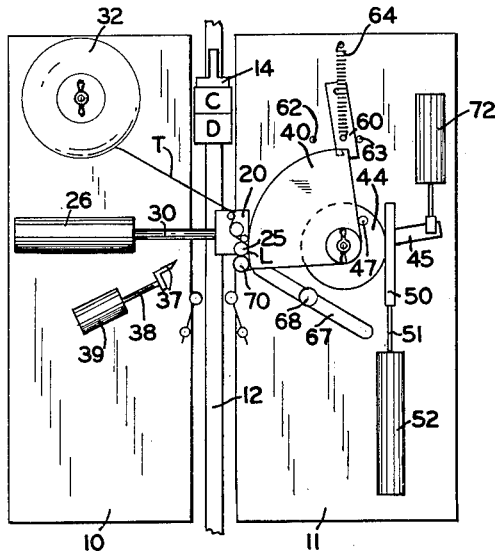

Referring now to FIGURES 2, 3, 4 and 5, the operation of the machine begins with the tape threaded as described above, and as is shown in FIGURE 1, and with the conveyor 12 in motion. When articles C and D are moved on conveyor 12 to the approximate position shown in FIGURE 2, compressed air is permitted to enter the drive side of air cylinder 26, expelling piston rod 30 to carry tape deck 20 across conveyor 12, as is shown in FIGURE 2. Since tape T is prevented from moving toward the supply roll 32 by the ratchet mechanism in roller 23, said tape is carried across conveyor 12 with the movement of tape deck 20, stripping tape T from said roll and causing said roll and hub 33 to rotate on shaft 34. The length of the drive stroke of piston rod 30 is set so that at the end of said stroke applying roller 25 will bear against the peripheral surface of flanged edge 41 of quadrant 40, with the free end L of tape T between said roller and said surface, and the pressure of said roller against the back surface of the tape will cause the free end L to become adhered to said surface.

Figure 3:
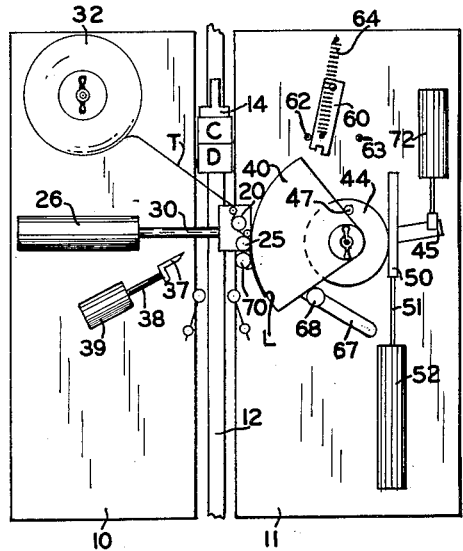
Figure 4:
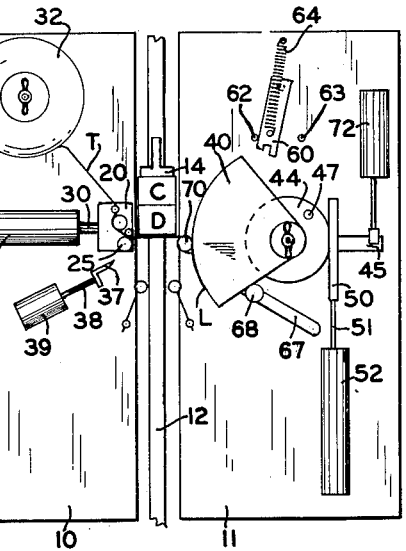

As is shown in FIGURE 3, tape deck 20 is held in this position while compressed air is permitted to enter the drive side of air cylinder 52, to expel piston rod 51 from said cylinder and rotate pinion 44 in the counter-clockwise direction, carrying quadrant 40 in that same direction through the engagement of said quadrant by stub shaft 47. Since the free end L of tape T has been adhered to quadrant 40, said free end is carried by said quadrant during this rotational movement, and a portion of tape adjacent said free end is pulled past roller 25 and adhered to the peripheral surface of flanged edge 41, stripping more tape T from supply roll 32, through the rollers on tape deck 20. The length of the drive stroke of piston rod 51 has been preset to rotate quadrant 40 to store the amount of tape desired, and at the end of said stroke, said quadrant will bear against stop 68.

Compressed air is then permitted to enter the retract side of cylinder 26, to retract piston rod 30, carrying tape deck 20 back across conveyor 12, to extend tape across the conveyor in front of moving articles C and D. Air is then permitted to enter the drive side of cylinder 72, to expel piston rod 71 and cause roller lever 45 to pivot on shaft 42, moving quadrant roller 70 to the position shown in FIGURE 4, so that the extended tape will form a barrier approximately straight across the conveyor perpendicular to the direction of motion of articles C and D. Air is then permitted to enter the retract side of cylinder 52, to rotate pinion 44 in the clockwise direction and carry stub shaft 47 away from the edge of quadrant 40, back to its original position, leaving quadrant 40 free for rotational movement in that direction. At this time, the machine is in the position shown in FIGURE 4, and articles C and D have been moved to about the position at which the leading surface of article C will contact the adhesive surface of the tape which is extended across conveyor 12.

Figure 5:
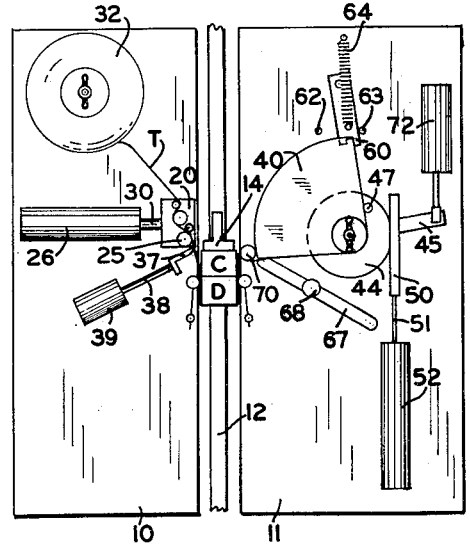

As the leading surface of article C contacts the adhesive surface of the extended portion of tape, said tape is adhered to said surface, and as articles C and D continue to move on conveyor 12 tape is pulled from adhesive contact with quadrant 40, around quadrant roller 70, and tape is simultaneously pulled from tape supply roll 32, through the rollers on tape deck 20. The position of wing nut 35, on shaft 34 and the position of wing nut 43 on shaft 42 have been set so that the pull of tape from quadrant 40 and supply roll 32 is approximately equal. The pressure exerted on the tape by the movement of articles C and D causes quadrant 40 to be rotated in the clockwise direction as tape is pulled from, and thus disadhered from, the surface of said quadrant. When quadrant 40 is thus moved near to its rest position, latch pin 66 is engaged into slot 65 in latch 60, and spring 64 causes said quadrant to move against stub shaft 47. Air is then allowed to enter the retract side of cylinder 72 and roller lever 45 is rotated in the counter-clockwise direction, moving quadrant roller 70 back to the position shown in FIGURE 5, to allow free end L to be pulled from adhesive contact with quadrant 40. Air is then allowed to enter the drive side of air cylinder 39, to expel piston rod 38 and to carry knife 37 against the tape, severing the tape as is shown in FIGURE 5. Air is then permitted to enter the retract side of cylinder 39, to retract knife 37 to its rest position.

The end of the tape which was severed from supply roll 32 is attached to the side of articles C and D by being pressed against the sides of said articles by buffing roller 80, and the tape which was pulled from quadrant 40 is attached to the other side of articles C and D by being pressed against the sides of said articles by buffing roller 75, as said articles are moved by conveyor 12. Articles C and D are then wrapped into a bundle by a length of tape, as were the articles A and B which are shown in FIGURE 1. The newly severed end of tape T is positioned adjacent to applying roller 25, and the machine is then in the position shown in FIGURE 1, and is ready to repeat the above described operation.

The area to which the tape is attached on the articles can be adjusted by changing the relative vertical positions between the conveyor and the platforms 10 and 11. The machine shown and described can be used to attach tape around all four sides of the articles by adjusting the machine to deliver a greater length of tape from both the quadrant and the supply roll and by providing additional well-known buffing rollers which attach tape around a corner, one set of said rollers being mounted on each side of the conveyor to contact the articles after the contact by the buffing rollers. Also, as is evident from the above description of an embodiment of my invention, variations in the operation and various modifications of my machine can be envisioned. For example, the storage means can be transported across the conveyor to contact the holding means, rather than as shown and described herein. Such variations, embodying some or all of the novel features herein disclosed are comprehended, and I do not intend to be limited only to the specific embodiment herein described, but, rather, I intend to be limited only of my disclosure taken as a whole, including the appended claims.

I claim:
1. A machine for attaching adhesive tape to articles being moved by a conveyor, said machine comprising means for holding one end from a quantity of said tape on one side of said conveyor, means for storing said end and a portion of said tape adjoining said end on the other side of said conveyor, means for transporting said end and tape adjoining said end across said conveyor, from the holding means side thereof to the storage means side thereof, and means for adhering said end and a portion of said tape adjoining said end to said storage means, said tape then being extended across said conveyor so that the adhesive side thereof will be contacted by and adhesively attached to said articles as said articles are moved by said conveyor; said storage means